United States Patent
Reijersen Van Buuren et al.

(10) Patent No.: US 10,028,445 B2
(45) Date of Patent: Jul. 24, 2018

(54) CONTINUOUS BALE FORMING APPARATUS WITH A RECIPROCATING BALE PUSHING DEVICE

(71) Applicant: FORAGE INNOVATIONS B.V., Maassluis (NL)

(72) Inventors: Willem Jacobus Reijersen Van Buuren, Maassluis (NL); Rudy De Jong, Maassluis (NL)

(73) Assignee: FORAGE COMPANY B.V., Maassluis (NL)

( * ) Notice: Subject to any disclaimer, the term of this patent is extended or adjusted under 35 U.S.C. 154(b) by 948 days.

(21) Appl. No.: 14/395,781

(22) PCT Filed: Apr. 19, 2013

(86) PCT No.: PCT/NL2013/050288
§ 371 (c)(1),
(2) Date: Oct. 20, 2014

(87) PCT Pub. No.: WO2013/157948
PCT Pub. Date: Oct. 24, 2013

(65) Prior Publication Data
US 2015/0083003 A1    Mar. 26, 2015

(30) Foreign Application Priority Data

Apr. 20, 2012 (NL) ................................. 2008667
Apr. 20, 2012 (NL) ................................. 2008668

(51) Int. Cl.
*A01F 15/07* (2006.01)
*A01F 15/08* (2006.01)

(52) U.S. Cl.
CPC ........ *A01F 15/0705* (2013.01); *A01F 15/071* (2013.01); *A01F 15/0883* (2013.01);
(Continued)

(58) Field of Classification Search
CPC .............. A01F 15/0705; A01F 15/0883; A01F 2015/0735; A01F 2015/074; A01F 2015/078
(Continued)

(56) References Cited

U.S. PATENT DOCUMENTS 4,062,172 A * 12/1977 Rice ..................... A01F 15/0705
100/77
4,088,069 A * 5/1978 Soteropulos ............ A01F 15/07
100/88

(Continued)

FOREIGN PATENT DOCUMENTS

EP    0 064 117 A1    11/1982
EP    0 672 340 A1    9/1995
(Continued)

*Primary Examiner* — Sean Michalski

(57) ABSTRACT

A bale forming apparatus and a bale forming method are provided. A bale is formed in a bale forming chamber. A bale pushing device pushes the bale away from an outlet onto a bale supporting construction. A guiding element is pivoted into a guiding position. The guiding element in the guiding position contributes to guide a bale forming mechanism such that a bale forming device a chamber is also provided when the bale is on the bale supporting construction. A new bale is formed in the provided bale forming chamber. The bale pushing device is pivoted around the pivoting axis in a pushing direction and backwards and performs a reciprocating movement. Pivoting the bale pushing device in the pushing direction causes the guiding element to be pushed and pivoted into the guiding position.

20 Claims, 8 Drawing Sheets

(52) U.S. Cl.
CPC ... *A01F 2015/074* (2013.01); *A01F 2015/078* (2013.01); *A01F 2015/0735* (2013.01)

(58) Field of Classification Search
USPC .......................................................... 100/3–5
See application file for complete search history.

(56) References Cited

U.S. PATENT DOCUMENTS

| | | | | |
|---|---|---|---|---|
| 4,336,750 | A * | 6/1982 | White | A01F 15/07 100/88 |
| 4,510,861 | A * | 4/1985 | Campbell | A01F 15/0705 100/88 |
| 4,534,285 | A | 8/1985 | Underhill | |
| 4,597,254 | A | 7/1986 | Bowden, Jr. | |
| 5,115,734 | A * | 5/1992 | Quartaert | A01F 15/0705 100/5 |
| 5,159,876 | A * | 11/1992 | Olin | A01F 15/0883 100/100 |
| 5,263,410 | A * | 11/1993 | Olin | A01F 15/0883 100/88 |
| 5,365,836 | A | 11/1994 | Campbell | |
| 5,450,704 | A * | 9/1995 | Clostermeyer | A01F 15/07 100/5 |
| 7,472,649 | B1 * | 1/2009 | Derscheid | A01F 15/0883 100/7 |
| 7,640,852 | B1 * | 1/2010 | Anstey | A01F 15/0833 100/87 |
| 2005/0235842 | A1 * | 10/2005 | Viaud | A01F 15/08 100/87 |
| 2005/0257513 | A1 * | 11/2005 | Smith | A01F 15/0883 56/341 |
| 2009/0107102 | A1 * | 4/2009 | Biziorek | A01F 15/0715 56/341 |
| 2012/0204738 | A1 | 8/2012 | Reijersen Van Buuren | |
| 2013/0036921 | A1 * | 2/2013 | Horstmann | A01F 15/0705 100/5 |
| 2013/0074709 | A1 * | 3/2013 | Thompson | A01F 15/0883 100/7 |
| 2014/0165856 | A1 * | 6/2014 | Varley | A01F 15/0705 100/40 |
| 2014/0174304 | A1 * | 6/2014 | Blough | A01F 15/0883 100/76 |
| 2015/0373916 | A1 * | 12/2015 | Roberge | A01F 15/0705 56/341 |
| 2016/0050851 | A1 * | 2/2016 | Kraus | A01F 15/0883 56/341 |
| 2017/0027107 | A1 * | 2/2017 | De Jong | A01F 15/0883 |
| 2017/0118919 | A1 * | 5/2017 | Tenbult | A01F 15/085 |
| 2017/0290267 | A1 * | 10/2017 | O'Brien | A01D 85/005 |
| 2017/0318749 | A1 * | 11/2017 | Kraus | A01F 15/0705 |
| 2018/0064033 | A1 * | 3/2018 | Olander | A01F 15/0825 |

FOREIGN PATENT DOCUMENTS

| | | |
|---|---|---|
| EP | 1 264 532 A1 | 12/2002 |
| WO | WO 99/08505 A1 | 2/1999 |
| WO | WO 2011/053120 A1 | 5/2011 |

\* cited by examiner

CONTINUOUS BALE FORMING APPARATUS WITH A RECIPROCATING BALE PUSHING DEVICE

BACKGROUND

The present invention relates to a bale forming apparatus and a bale forming method for forming cylindrical bales.

A bale forming apparatus as used for agricultural purposes is an agricultural vehicle to form bales of crop material. The bale forming apparatus usually comprises an intake device to take up crop material from a ground surface and a bale forming device to form a bale from the crop material.

In a known embodiment, the bale forming device comprises at least one endless belt, preferably several parallel endless belts, guided by guiding rollers. An outlet of the intake device is arranged between two guiding rollers so that crop material is fed between the two guiding rollers towards the endless belt(s). Due to the feeding of crop material between the two guiding rollers a bale forming chamber is formed by the belt(s). By further feeding crop material through the outlet the bale forming chamber can be filled until a bale with a desired diameter is obtained.

The bale forming chamber is surrounded by a fixed front housing and a pivotal tailgate of the bale forming apparatus. For forming a bale under pressure the tailgate must be connected with the front housing. Opening of the pivotal tailgate ejects and thereby releases the bale from the bale forming chamber. Before ejecting a bale, this bale must be wrapped into a net or foil. Before the formation of a new bale under pressure can be started, the pivotal tailgate must be closed again.

The wrapping of the bale as well as the opening and closing of the tailgate take considerable time during which the bale forming apparatus cannot be used for formation of a new bale. This has the consequence that the intake of new crop material has to be temporarily interrupted by stopping the forward movement of the bale forming apparatus over the ground surface.

To overcome this disadvantage, several concepts for so-called continuous round balers were presented.

STATE OF THE ART

The round baler 10 of U.S. Pat. No. 4,534,285 comprises a first upper bale forming apron 26. This first apron 26 is guided around several guide members 28 to 42 mounted at the base frame 12 and guided around further guide members 44, 46, 48 mounted at the rear frame 22, cf. FIG. 1. A lower apron 20 is supported by the base frame 12. A second upper bale forming apron 52 is guided around members 54 to 62 mounted at the rear frame 22. The aprons 26, 52 are formed by endless link-type chain. The guide members 40 around which the first upper apron 26 is guided are held by a pair of arms 68. These arms 68 are pivotally mounted on a shaft 70. Hydraulic cylinders 72 can pivot the arms 68. Several rams 66 are mounted below the apron 26 and extends between the sidewalls of the base frame 12. An actuator 76 connects the rams 66 with the arms 68. The guide members 40 can move up and down in longitudinal vertical slots 74 arranged in the sidewalls.

During operation of the baler 10 of U.S. Pat. No. 4,534,285 a front bale chamber 50 is formed between the lower apron 20 and first upper apron 26, cf. FIG. 1. The guide members 40 are in the lower most position in the slots 74. The apron 26 and the rams 66 close the rear end of the front bale chamber 50. A bale increases in the front bale chamber 50. When the bale has reached a preset diameter, the guide members 40 are moved in the slots 74 in the uppermost position, cf. FIG. 3. This is effected by the hydraulic cylinder 72 which moves the arms 68. The connecting actuator 76 causes the rams 66 moving downwards. The apron 20 transports the bale into a rear bale chamber 64, cf. FIG. 4. This rear bale chamber 64 is formed between the upper aprons 26 and 52 and a stationary roller 65. The guide members 40 are moved downwards into an intermediate position. The actuator 76 causes the rams 66 moving upwards again. The bale further increases while being in the rear bale chamber 64, cf. FIG. 5. The creation of a further bale in the front bale chamber 50 starts. If the bale in the rear bale chamber 64 has reached the preset size, the guide members 40 are moved in the lowermost position, cf. FIG. 6. The bale in the rear bale chamber 64 is wrapped, cf. FIG. 7 and is ejected, cf. FIG. 8.

U.S. Pat. No. 4,597,254 discloses a continuous round baler. Pressing belts 68 are guided around several rollers 40, 42, 44, 46, 48, 50, 52, 54, 56, 58, 72, cf. FIG. 1. Two disks 68 are mounted on stub shafts 70 which are rotatably mounted at the two sidewalls 13. The indexing roller 72 connects the two disks 68 and has a distance to rotating axis of the disks 68, i.e. to the stub shafts 70. Several teeth 74 at the peripheral edges of the disks 68 engage into sprockets 76 mounted on brackets 78. The sprockets 76 are connected by a cross shaft 80. One end of the shaft 80 is connected with a clutch and brake device.

Crop material is picked up by the baler of U.S. Pat. No. 4,597,254 and is conveyed through a nip between the conveyer 28 and a press roller 38. The clutch and brake device operates as a brake and holds the disks 68 and thereby the indexing roller 72 in a home position. Between the lower span 67 of the belts 68 and the upper run 29 of the conveyer 28 a bale starting zone 69 is created. The bale increases in this bale starting zone 69 and stretches the belts 66. If the bale has reached a required diameter, the clutch and brake device operates as a clutch. The shaft 80 drives the sprocket 76 which causes the disks 68 rotating. The indexing roller 72 is moved away from the nip between the elements 28 and 38, cf. FIG. 2, on a circular path. The indexing roller 72 becomes out of engagement with the belts 66. The bale is moved away from the nip and engages partially into the tailgate 16, cf. FIG. 3 and FIG. 4. The disks 68 perform a 360 degrees rotation back into the home position. The baler starts to create a new bale.

U.S. Pat. No. 5,365,836 and EP 672340 B1 disclose a round baler 10 with a lower bale forming means (conveyor 24) and a serious of endless belts 45. The belts 45 are guided around rollers 31 to 34 mounted at the sidewalls 118 of the frame 11 and around further rollers 35 to 41 mounted at the pivotal tailgate 13. Two disks 46 are disposed parallel to the and between the sidewalls 118. An indexing member 48 has the form of a transverse roller and is mounted between the disks 46. Several teeth 50 at the peripheral edge of the disks 46 mesh with sprockets 51 which are connected with a cross shaft 53. This cross shaft 53 is connected with a brake and clutch device. The belts 45 are guided around an indexing member 48. A first baling chamber is formed above the conveyer 24 and below the belts 45. A second baling chamber is surrounded by the belts 45, cf. FIG. 1 and FIG. 2. The baler 10 operates similar to that baler described in U.S. Pat. No. 4,597,254.

WO 2011/053120 A1 and US 2012/0204738 A1 disclose a round baler working in a continuous manner. An endless belt 10 is guided around for moveable guiding elements 11a, 11b, 11c, and 11 b and a round fixed guiding element 12 and tensioning element 13. The four moveable guiding elements 11a, 11b, 11c, 11 d are mounted on four arms 15 which in turn are mounted on a rotatable element 16, cf. FIG. 1. Every arm 15 can be rotated by means of an actuator 16. The moveable guiding elements 11a, 11 b form a first pair. The moveable guiding elements 11c, 11d form a second pair. Every pair can be moved into an intake position, a releasing position, and a back end support position. This movement is effected by rotating the arms 15 around an axis through the rotatable element 16. FIG. 1 shows the first pair with the guiding elements 11 a, 11 b in the intake position near the outlet 8 of an intake device. The baling chamber is formed between these two guiding elements 11 a, 11 b. After the bale B is created, the first pair is rotated from the intake position into a releasing position, cf. FIG. 2. The bale B can be ejected. Simultaneously the second pair 11c, 11d is moved into the intake position such that the creation of a second bale B2 can be started before the first bale B is ejected.

EP 1264532 A1 discloses a round baler 10 with six guiding elements 54a, 56a, 58a mounted on three arms 54, 56, 58. Every guiding element 54a, 56a, 58a comprises two rollers. A flexible belt forming means 118, e.g. several endless belts, is guided around these six guiding elements and around further rollers. Every arm 54, 56, 58 is formed of two parts 60, 62. These arm parts 60, 62 are hingedly connected or are connected like a telescope. The three guiding elements 54a, 56a, 58a define a main bale forming chamber 24 and an auxiliary bale forming chamber 26, cf. FIG. 5. A bale 22 is formed in the auxiliary bale forming chamber 26 defined by the guiding elements 54a and 56a, cf. FIG. 2. By rotating the arms 54, 56 the bale 22 is moved away from the intake into a transition position. The arms are further rotated and the bale 20 in the main bale forming chamber 24 reaches its full size, cf. FIG. 4. This bale 20 is wrapped while a further bale 22 is formed in the auxiliary bale forming chamber 26 which is now formed by the guiding elements 56a and 58a, cf. FIG. 5. The wrapped bale is ejected, cf. FIG. 6.

PROBLEM, SOLUTION

It is an object of the invention to provide a bale forming apparatus and a bale forming method which form cylindrical bales in a continuous manner and which lead to an apparatus with a reduced height compared with a baler where a bale is pushed by means of rotating disks or rotating arms. "Continuous manner" means: The bale forming apparatus needs not to be stopped for finishing the creation of a bale formed in the bale forming chamber.

This problem is solved by a bale forming apparatus according to claim 1 and a bale forming method according to claim 16. Preferred embodiments are specified in the dependent claims.

The bale forming apparatus and the bale forming method according to the invention form cylindrical bales from material. The apparatus comprises the following parts which are also used by the method:

An intake device conveys material through an outlet into a bale forming chamber. This bale forming chamber is arranged adjacent to the outlet.

This bale forming chamber is surrounded by a bale forming means.

Several guiding members guide this bale forming means.

A bale forming device forms a cylindrical bale in the bale forming chamber by the bale forming means. This bale is formed from material which has been conveyed through the outlet into the bale forming chamber.

A bale pushing device pushes the bale away from the outlet and onto a bale supporting construction. The bale pushing device and the bale supporting construction belong to the bale forming apparatus.

A pivotal guiding member is pivoted into a guiding position. This pivotal guiding member contributes to guide the bale forming means while being pivoted into the guiding position.

By this a bale forming chamber is also provided while the bale supporting construction carries the bale which has been pushed away from the outlet. The forming of a further bale is started or can be started in this provided bale forming chamber while the pushed bale is still on the bale supporting construction. This further bale is created from material which is conveyed into the bale forming chamber while the bale supporting construction carries the old bale.

The bale pushing device is pivotally mounted and can be pivoted around a pivoting axis. This bale pushing device is pivoted from a pushing start position in a pushing direction into a pushing end position and back from the pushing end position into the pushing start position. The bale pushing device performs a reciprocating movement when pivoted from the pushing start position into the pushing end position and back into the pushing start position.

Pivoting the bale pushing device in the pushing direction causes the bale to be pushed away from the outlet and onto the bale supporting construction.

The pivotal guiding member is connected with the bale pushing device. Pivoting the bale pushing device in the pushing direction causes the pivotal guiding member to be pivoted into the guiding position.

ADVANTAGES

The invention provides a bale forming apparatus and a bale forming method which can be operated in a continuous manner, i.e. can form, wrap, and eject cylindrical bales without the need of stopping the bale forming apparatus. While the bale is wrapped and ejected, the intake device can convey further material picked-up from the ground through the outlet and this further material can be stored in the bale forming chamber. As the bale pushing device has pivoted the old bale away from the outlet, the bale forming chamber is released and can press or otherwise process this further material which is conveyed through the outlet. The formation of a new bale from this further material is started while the old bale is still on the bale supporting construction.

The bale supporting construction behind the bale forming chamber buffers a bale until the creation of this bale is finished. It is possible to complete the process of forming the bale while the bale is on the bale supporting construction. In particular the bale supporting construction buffers the bale while the bale is wrapped into net or foil or twine, e.g. This completion step can be performed outside the bale forming chamber such that the bale forming chamber is released for forming a further bale. This effect is achieved as the old bale is carried by the bale supporting construction until the formation of this old bale is finished.

During this buffer step further material can be picked up and can be processed in the bale forming chamber surrounded by the bale forming means. The bale forming apparatus carries temporally two bales: the old bale on the bale supporting construction and a new bale growing in the bale forming chamber adjacent to the outlet.

Thanks to the invention it is not necessary to provide a pre-baling chamber or a pre-pressing channel or a prestorage being situated upwards from the bale forming chamber, in particular no chamber or channel between the outlet of the intake device and the bale forming chamber. In contrast to a baler with a pre-baling chamber or a pre-pressing channel, a formed bale is stored on the bale supporting construction before being ejected. This bale supporting construction can operate as a tailgate or can be integrated into a tailgate which can be opened for ejecting a bale. Therefore the invention provides a bale forming apparatus which can be implemented with a smaller length than other continuous balers. The invention can be implemented with an existing tailgate.

According to the invention a bale forming apparatus with a bale forming means guided by several guiding members and a bale supporting construction is provided. It is possible to arrange the bale supporting construction sufficiently far away from the outlet of the intake device and therefore sufficiently far away from the bale forming chamber adjacent to the outlet. One effect is that an old bale on the bale supporting construction does not hamper the forming of a new bale in the bale forming chamber—even in the case that a lot of material is conveyed through the outlet in the time period between pushing the old bale away from the outlet and ejecting this bale.

Thanks to the invention it is possible to adapt the dimension of the bale supporting construction and its position with respect to the outlet such that given constrains and requirements are fulfilled, e.g. a required bale size or a pick-up rate or throughput rate through the outlet.

According to the invention the pivotal guiding member being in the guiding position contributes to guiding the bale forming means if the bale pushing device has been pivoted into the pushing end position. Therefore the pivotal guiding member contributes to guiding the bale forming means while the completed bale is carried by the bale supported construction. By this a bale forming chamber surrounded by the bale forming means is also provided while the bale support construction being in the bale supporting position carries the bale. The pivotal guiding member can be pivoted from the guiding position into a further position in which it does not form an obstacle for forming a bale in the bale forming chamber.

In particular this feature enables to implement a bale forming apparatus which forms cylindrical bales in a continuous manner. Material provided by the intake device through the outlet is collected in the bale forming chamber surrounded by the bale forming means while the bale support construction carries the bale. The pivotal guiding member in the guiding position contributes to form this bale forming chamber. This material can be collected while the old bale is still on the bale supporting construction as a baling chamber for collecting this material is provided.

According to the invention the pivotal guiding member pivoted in the guiding position and the bale pushing device pushes the bale onto the bale supporting construction. The pivotal guiding member is connected with the bale pushing device, e.g. mechanically or by a suitable control unit of the bale forming apparatus. This connection ensures that the pivotal guiding member in the guiding position contributes to the bale forming chamber if required, namely if the bale is on the bale supporting chamber and further material is conveyed through the outlet and a bale forming chamber for this further material must be formed adjacent to the outlet.

The pivotal guiding member enables in an easy way that one segment of the bale forming means surrounds the bale forming chamber adjacent to the outlet. If the bale supporting construction is in the bale supporting position, a further segment of the bale forming means surrounds a bale on the bale supporting construction while the bale is finished. The pivotal guiding member in the guiding position defines and separates these two segments from each other. It is not necessary to provide a specific bale keeping means for keeping a bale being on the bale supporting construction and prevents the bale from falling apart. It is possible to pivot the pivotal guiding member into a parking position while no bale is on the bale supporting construction.

In contrast to other continuous round balers, the bale forming apparatus according to the invention does not require two different bale forming chambers. Therefore it is not necessary to provide an intake device which conveys material to several different locations of the bale forming apparatus. In contrast the intake device needs not to have two different outlets. In addition, only one bale forming chamber is required as the bale pushing device pushes away a completed bale in this out of this one bale forming chamber. Therefore the intake device needs not to serve different outlets but only one outlet to this one bale forming chamber.

A further advantage of a bale forming apparatus according to the invention is that the baler is shorter than a baler with two consecutive bale forming chambers.

The invention provides a reliable and a fashioned construction to implement the movement of a bale from the bale forming chamber onto the bale supporting construction. Thanks to the invention the finished bale can be placed at sufficient distance from the outlet to prepare and to perform the step of ejecting the bale out of the bale forming apparatus. The formation of a further bale adjacent to the outlet of the intake device can simultaneously be started and the finished bale does not hamper this formation.

According to the invention the bale pushing device performs a reciprocating movement. This feature yields a bale forming apparatus with less height compared with a baler where a wheel or several arms are rotated around the horizontal rotating axis and pushes the bale away from the outlet onto the bale supporting construction.

The bale pushing device can be arranged such that the bale pushing device in the pushing start position or in a further position does not form an obstacle for forming a bale in the bale forming chamber.

EMBODIMENTS

The bale forming means may comprise several pressing rollers, one endless pressing belt, several parallel endless pressing belts and/or an apron with linked chain elements. The guiding member may comprise rollers which can rotate around rotating axes being perpendicular to the conveying direction of the bale forming means and perpendicular to the rotating axis of the holding device.

In one embodiment one guiding member is mounted at the bale supporting construction. The bale supporting construction may comprise a bale carrying member and a bale supporting frame. The guiding member is mounted at the bale carrying member. The bale carrying member can in one embodiment be pivoted with respect to the supporting frame. The bale supporting frame is pivotally connected with a frame of the bale forming apparatus.

In one embodiment the bale pushing device reciprocates in a space which is arranged between the pivoting axis of the bale pushing device and the outlet of the intake device. This embodiment yields a very compact bale forming apparatus.

The bale pushing device may be arranged below the pivoting axis. The bale forming chamber is arranged between the pivoting axis and the outlet.

In one embodiment the bale pushing device is arranged below the pushing device pivoting axis and above the outlet. This embodiment leads to a bale forming apparatus with even reduced height. The bale pushing device engages a bale in the bale forming chamber from above, i.e. from a position above the bale.

In one embodiment the bale pushing device pushes a bale which is surrounded by the bale forming means. The bale remains surrounded by the bale forming means while being shifted onto the bale supporting construction and while being supported by the bale supporting construction. One segment of the bale forming means surrounds this bale on the bale supporting construction. A further segment surrounds the bale forming chamber adjacent to the outlet in which a new bale is formed. This embodiment saves two different bale forming means as well as save a specific bale surrounding means for the bale on the bale supporting construction.

Preferably the bale pushing device comprises a pushing arm with an inner arm element and an outer arm element. The outer arm element pushes the bale onto the bale supporting construction and is hingedly connected with the inner arm element. Preferably the inner arm element can be pivoted around the pivoting axis of the bale pushing device. The outer arm element follows the inner arm element and can in addition be pivoted with respect to the inner arm element. A suitable drive pivots the inner arm element as well as the outer arm element.

This embodiment enables to implement a baler with a less height than a baler with a rigid bale pushing unit, e.g. a rigid arm or hook, as the bale pushing device. The pushing arm with the two arm elements can be retracted, i.e. folded together, and can be pivoted from the pushing end position into the pushing start position in this folded state. For pushing a bale the pushing arm is expanded, i.e. the outer arm element is pivoted away from the inner arm element.

In one embodiment the outer arm element and the inner arm element form approximately one rod when being in the extended state. In a further embodiment an angle between the outer arm element and the inner arm element also occurs when the pushing arm is in the expanded state.

This reduced height enables the baler to path under low bridges, e. g. The distance between the pushing device pivoting axis and the free end of the outer arm element increases when the pushing arm is transferred into the expanded state.

In one embodiment the outer arm element is hingedly connected with the inner arm element such that two end portions of the two arm elements are connected with each other. The outer arm element has one free end opposite to this hinged connection.

It is also possible that the outer arm element is rotated or otherwise pivoted with respect to the inner end. In this embodiment the outer arm element has two free ends and the inner arm element one free end opposite to the pivoting axis.

In a further embodiment the bale pushing device comprises an oscillating piston. Preferably this piston moves linearly in the pushing direction and linearly in the opposite direction.

Different embodiments are possible how to connect the pivotal guiding member with the bale pushing device. Therefore different embodiments are possible how the step of pushing the bale pushing device in the pushing direction causes the pivotal guiding member to be pivoted into the guiding position. In one embodiment the pivotal guiding member is mechanically connected with the bale pushing device. The pivotal guiding member may mechanically be connected with the bale pushing device by means of a pivotal guiding member arm. Preferably the pivotal guiding member is mounted on the bale pushing device such that the pivotal guiding member can rotate around its own rotating axis but cannot be moved with respect to the bale pushing device. This embodiment provides a mechanically stable construction and saves an own drive and a pivoting axis especially for the pivotal guiding member.

In a further embodiment an electronic control unit triggers the two steps that the bale pushing device is moved in the pushing direction and the pivotal guiding member is pivoted into the guiding position.

This is a further way of connecting the pivotal guiding member with the bale pushing device.

In one embodiment the bale supporting construction carrying a bale can be pivoted from a bale receiving position into at least one further position. Preferably the bale on the bale supporting construction is pivoted away from the outlet if the bale supporting construction is pivoted from the bale receiving position into the further position. The distance between the bale and the outlet increases such that more space for a bale forming chamber adjacent to the outlet remains. This embodiment allows providing an increased bale forming chamber adjacent to the outlet. Therefore the bale forming chamber can process more material which is conveyed through the outlet while the completed bale is on the bale supporting construction. In addition larger bales can be formed by a baler according to this embodiment operating in a continuous manner as more space for formed a bale is available on the bale supporting construction.

According to this embodiment a bale is moved away from the outlet in at least two steps. In the first step the bale is pushed away from the outlet and onto the bale supporting construction being in the bale receiving position. The first step can be performed such that the bale is pushed in an approximately horizontal direction. In the consecutive second step the bale supporting construction carrying the bale is pivoted in one further position. This further position can be a bale ejecting position or an intermediate bale supporting position in which the formation of the bale is completed; e.g. a wrap is placed around the entire bale.

In one embodiment the bale supporting construction can be pivoted into a bale receiving position, from the bale receiving position into a bale supporting position and from the bale supporting position into the bale ejecting position. Therefore the bale supporting construction is pivoted into two further positions. The bale pushing device pushes a bale onto the bale supporting construction being in the bale receiving position. A first pivoting mechanism pivots the bale supporting construction carrying this bale from the bale receiving position into the bale supporting construction. A second pivoting mechanism pivots the bale supporting construction carrying this bale from the bale supporting position into the bale ejecting position.

It is possible that the same part of the bale forming apparatus operates as a first pivoting mechanism as well as the second pivoting mechanism. But preferably two different mechanisms are provided as the first pivotal movement has a characteristic different from the second pivotal movement. During the first pivotal movement the bale is shifted in a substantially horizontal direction away from the outlet, e.g. by rotating a bale carrying member for the bale around a horizontal rotating axis. As a result of the second pivotal movement the bale should be ejected by force of gravity. Therefore the carrying member has to be brought into an orientation in which the bale roles off or drops from the carrying member when the second pivotal movement is performed.

In one embodiment the bale forming apparatus comprises a wrapping device which is arranged such that the bale forming chamber is between the outlet and the wrapping device. Preferably the wrapping device is connected with the bale supporting construction, e.g. mounted at an outer surface of the bale supporting construction. The embodiment with the wrapping device behind the bale forming chamber enables the wrapping device to inject wrapping material into the bale forming chamber as early as possible, even before the bale is pushed onto the bale supporting construction. The bale is pushed before the wrapping material reaches the outlet such that no wrapping material is mixed with material conveyed through the outlet into the bale forming chamber.

In one embodiment the bale pushing device is pivoted in a position where it shortly blocks the path of material through the outlet into the bale forming chamber. No material can be conveyed into the bale forming chamber for a short period. One embodiment solves this problem as follows: The intake device comprises a feeding channel with a pivotally mounted feeding channel bottom. The feeding channel leads from an inlet of the intake device to the outlet. The bottom can be lowered down such that the capacity of the intake device is increased. Material can be buffered in this enlarged intake device until the connected guiding member has passed the outlet. A resilient means, e.g. a spring, pivots the channel bottom back into the standard position. The bottom can be lowered down against the force of this resilient means.

In one embodiment the bale forming apparatus is moved over ground. A pick-up unit picks up material from the ground and conveys the material to the intake device. This application is in particular used for forming cylindrical bales from agricultural material (hay, straw, silage, e.g.). The bale forming apparatus may be a self-propelled vehicle or is pulled by a tractor.

In a further embodiment the bale forming apparatus operates as a stationary plant. Material is fed to the intake device. This application is in particular used for compacting recycling material, e.g. paper or card board or plastic material.

DESCRIPTION OF EMBODIMENT

In the following an embodiment of the invention is explained in further detail, by way of example only, with reference to the accompanying drawings, in which.

Figure 1:
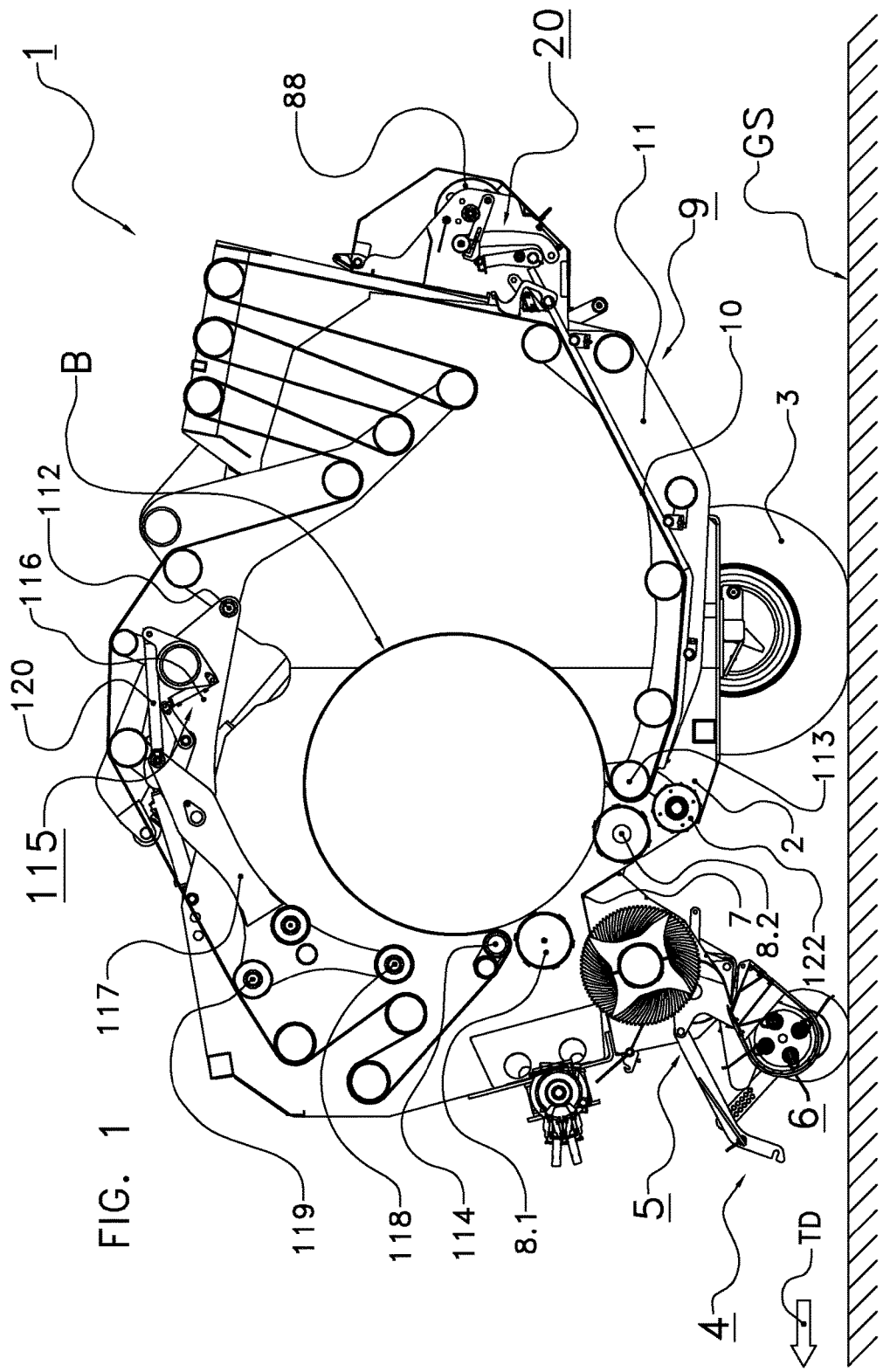
FIG. 1 shows the bale forming apparatus with a bale in the bale forming chamber having reached the required size and the bale supporting construction in the bale receiving position before the bale has been pushed onto the bale supporting construction and the bale pushing device in the pushing start position.

FIG. 1 shows a bale forming apparatus, generally indicated with reference numeral 1. The bale forming apparatus 1 comprises a frame 2 which is supported by wheels 3. The bale forming apparatus 1 is configured to be connected at its front end 4 to a pulling vehicle, for instance to a tractor. The bale forming apparatus 1 is adapted for being pulled in a travelling direction TD, that is in FIG. 1 from right to left.

The bale forming apparatus 1 comprises an intake device 5 to take in crop material, such as silage, grass, hay, from a ground surface GS. The intake device 5 comprises an inlet 6 and an outlet 7. The intake device 5 of the embodiment further comprises a feeding rotor with rigid tines and can comprise a cutting arrangement (not shown) with several blades engaging between these rigid tines. At opposite sides of the outlet 7 two stationary supporting rollers 8.1, 8.2 are provided. The rotating axes of these two supporting rollers 8.1, 8.2 are perpendicular to the drawing plane of FIG. 1.

Via the inlet 6 crop material is taken from the ground surface GS and transported to the outlet 7. A drum provided at the inlet 6 may be provided with tines to facilitate the picking up of crop material. The tines at the inlet 6 can be mounted in a flexible manner such that they can adapt to the ground profile.

The frame 2 comprises a front housing part. A bale forming device 9 is arranged on the frame 2 to form bales of crop material. The bale forming device 9 comprises at least one endless belt 10 and a number of guiding elements supporting the endless belt 10. Preferably several belts 10 are arranged parallel to each other. The belt(s) 10 operate as the bale forming means. A tensioning device is provided to maintain tension in the belt(s) 10.

The back end of the bale forming apparatus 1 is provided with a tailgate 11 which is constructed to support in a support area a bale B arranged on the tailgate 11. In FIG. 1 no bale is on the tailgate 11. The tailgate 11 is pivotal about a horizontal rotation axis with respect to the frame 2. In the preferred embodiment the tailgate 11 is at least movable (pivotal) between a bale receiving position, a bale supporting position and a bale ejecting position. This tailgate 11 serves as the bale supporting construction.

In FIG. 1 the tailgate 11 is shown in the bale receiving position. This bale receiving position is also the position which the tailgate 11 takes during the formation of a bale in the bale forming chamber and is also the transport position, i.e. the position in which the tailgate 11 is preferably positioned when the bale forming apparatus is not used to create bales but is pulled over a public street, e.g.

The tailgate 11 comprises at its free end a tailgate-mounted guiding roller 113 which is positioned, in the position of the tailgate 11 in FIG. 1, next to the outlet 7. At the other side of the outlet 7, a fixed guiding roller 114 is mounted at the frame 2. The endless belt(s) 10 are arranged about and around the guiding rollers 113, 114 so that feeding crop material into the bale forming device 9 results in the formation of a bale forming chamber delimited by a part of the endless belt 10 arranged between the guiding rollers 113 and 114.

The bale forming apparatus 1 is configured to hold a bale in a first bale position and afterwards a second bale position. The first bale position is arranged next to the outlet 7 of the intake device 5, and the second bale position is spaced away from the outlet 7. FIG. 1 shows the bale B in the first bale position.

In the first bale position, the bale B formed or being formed is mainly supported by the two stationary supporting rollers 8.1, 8.2 arranged at opposite sides of the outlet 7 of the intake device 5, but may also partially be supported by the tailgate 11, in particular by the tailgate-mounted guiding roller 113. The bale in the first bale position is in a bale forming chamber and is surrounded by the bale forming means, i.e. the belt(s) 10.

Figure 3:
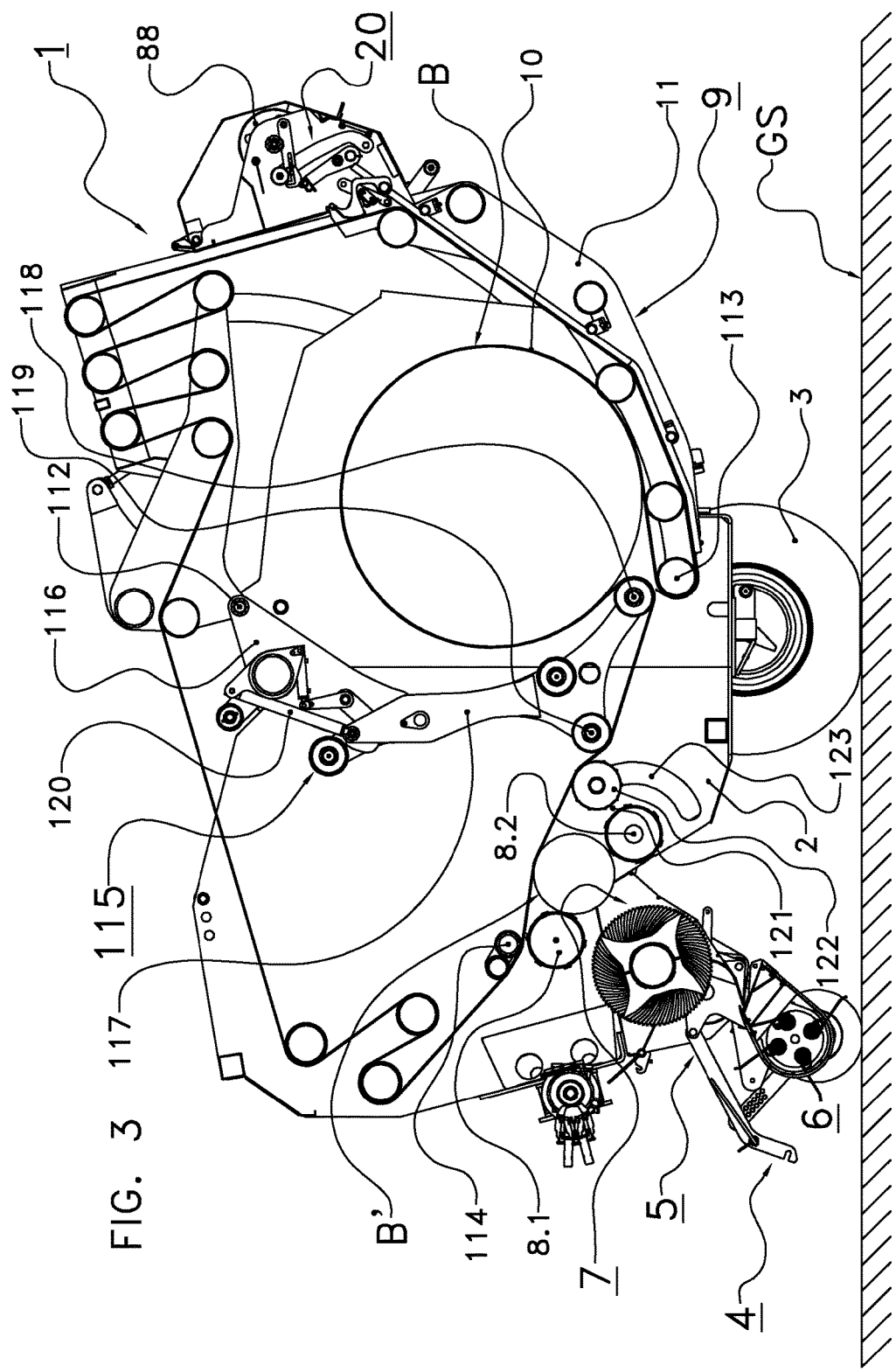
FIG. 3 shows the bale forming apparatus of FIG. 2 with the bale supporting construction pivoted into the bale supporting position, the formation of a new bale in the bale forming chamber started, and the bale pushing device being pivoted in the pushing end position.

The second bale position is defined by the bale supporting position of the tailgate 11, cf. FIG. 3. Thus, in this bale supporting position, the tailgate 11 holds a bale B in the second bale position. This second bale position is positioned such that a new bale can be at least partially formed in the first bale position before the bale in the second bale position is ejected by the bale forming apparatus 1. Therefore the bale forming apparatus 1 carries at the same time a complete bale B on the bale supporting construction 11 and an increasing bale B' in the bale forming chamber adjacent to the outlet 7.

A bale B can be transported from the first bale position to the second bale position by the following consecutive steps:
Moving the bale from the first bale position away from the outlet 7 and onto the tailgate 11 arranged in the bale receiving position (first step) and
subsequently moving the tailgate 11 with the bale B from the bale receiving position into the bale supporting position (second step).

The first step is performed by a bale pushing device. This bale pushing device of the embodiment comprises a pivotal pushing arm 115 which is pivotally mounted on the frame 2. This pivotal pushing arm 115 together with a suitable drive are parts of the bale pushing device of the embodiment. In the embodiment the tailgate 11 and the pivotal pushing arm 115 are pivotally mounted about the same axis of rotation 112. The pivotal pushing arm 115 is constructed to push a bale from the first bale position onto the tailgate 11. A drive pivots this pivotal pushing arm 115.

The pivotal pushing arm 115 comprises an inner arm element 116 and an outer arm element 117. An inner end of the inner arm element 116 is pivotally mounted at the axis of rotation 112. The outer arm element 117 is pivotally mounted to the opposed end of the inner arm element 116. The outer arm element 117 is hingedly connected with the inner arm element 116 and can be moved between an extended position, as shown in FIG. 1, and a retracted position with respect to the inner arm element 116, cf. FIG. 5 and FIG. 6. The radial extent of the pivotal pushing arm 115 with respect to the axis of rotation 112 in the extended position is substantially larger than the radial extent in the retracted position. At the distal end of the outer arm element 117 a first arm-mounted guiding roller 118 and a second arm-mounted guiding roller 119 are positioned. The first arm-mounted guiding roller 118 and the second arm-mounted guiding roller 119 are spaced-apart with respect to each other in the tangential direction of the axis of rotation 112 of the pivotal pushing arm 115. The guiding rollers 118, 119 can rotate around their own rotational axis but cannot change their positions with respect to the pivotal pushing arm 115. These rotational axes are perpendicular to the drawing plain of FIG. 1. The second arm-mounted guiding roller 119 serves as the pivotal guiding member.

The inner arm element 116 and the outer arm element 117 are freely rotatable with respect to each other between the extended position and the retracted position. A locking device 120 may be provided which is configured to lock the outer arm element 117 in the extended position with respect to the inner arm element 116.

The pivotal pushing arm 115 with the outer arm element 117 in the extended position is used to push the bale B from the first bale position onto the tailgate 11 when the tailgate 11 is arranged in the bale receiving position. The retracted position of the outer arm element 117 may be advantageous to bring the pivotal pushing arm 115 back to a start position as will be explained hereinafter.

The formation and transfer of a bale until release and the function of the different parts of the baling device 1 therein will now be discussed in more detail.

FIG. 1 shows the baling device 1 with the tailgate 11 in the bale receiving position, e.g. the fully closed position of the tailgate 11, and the pivotal pushing arm 115 in a first position or pushing start position and having the outer arm element 117 in the extended position. Crop material is introduced into a bale forming chamber surrounded by the belt segment between the tailgate-mounted guiding roller 113 and the fixed guiding roller 114. A bale B is being formed in the first bale position where it is mainly supported by the stationary support rollers 8.1, 8.2. By continuous feeding of crop material the bale B grows until a selected parameter is fulfilled, such as a desired diameter of the bale B or a given weight is achieved, a selected time interval has passed, or a selected tension in the endless belt is reached. It is remarked that the selected parameter can be monitored by any suitable sensor. For example, an ultrasonic or optical sensor, preferably directed radially with respect to the bale B may be provided to measure a diameter of the bale B being formed in the bale forming device 9. A tension sensor may monitor the tension of the endless pressing belts 10.

The bale B shown in FIG. 1 is ready to be transferred to the second bale position, for instance since the bale has a desired diameter or exerts a pressure to the belt(s) 10 which exceeds a given threshold. A first step to transfer the bale to the second bale position is to transfer the bale B onto the tailgate 11 so that the bale B is supported by the tailgate 11. To move the bale B onto the tailgate 11, the bale B is pushed by the pivotal pushing arm 115 by rotating the pivotal pushing arm 115 in a pushing direction opposite to the travelling direction TD with respect to the frame 2 over an angle to a second position. To avoid any unintended pivoting movement between the inner arm element 116 and the outer arm element 117, the locking device 120 is activated to lock the outer arm element 117 in the extended position with respect to the inner arm element 116.

Figure 2:
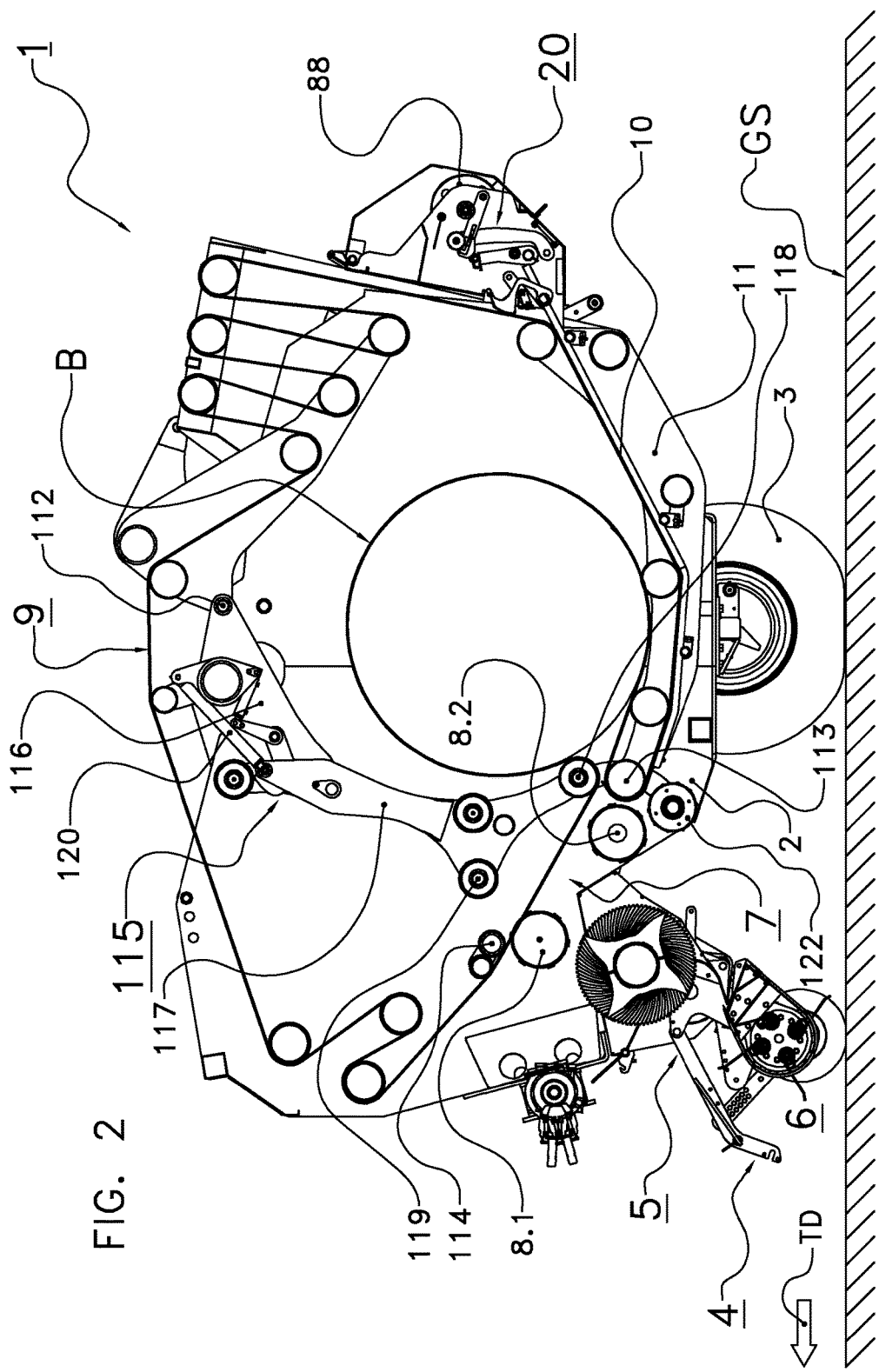
FIG. 2 shows the bale forming apparatus of FIG. 1 with the bale pushed onto the bale supporting construction and the bale pushing device being in an intermediate position between the pushing start position and the pushing end position.

FIG. 2 shows the baling device 1 after movement of the pivotal pushing arm 115 from the first position to the second position. The bale B has been pushed onto the tailgate 11.

The tailgate 11 is still in the bale receiving position. The bale B remains surrounded by the bale forming means 10 while being pushed.

Due to the movement of the pivotal pushing arm 115 along the outlet 7 of the intake device 5, the function of the fixed guiding roller 114 to form the bale forming chamber holding the bale is taken over by the first arm-mounted guiding roller 118 of the pivotal pushing arm 115, i.e. the bale forming chamber formed for holding the bale is formed by an area of the belt(s) 10 between the tailgate-mounted guiding roller 113 and the first arm-mounted guiding roller 118. After the pushing movement of the pivotal pushing arm 115, the pivotal pushing arm 115 is arranged in the second position, wherein the first arm-mounted guiding roller 118 is arranged in a certain relative position with respect to the tailgate-mounted guiding roller 113 on the tailgate 11, as shown in FIG. 2.

In a second step of the transfer of the bale B from the first bale position to the second bale position, the tailgate 11 and the pivotal pushing arm 115 are rotated over substantially the same angle, whereby the tailgate 11 is moved from the bale receiving position to the bale supporting position and the pivotal pushing arm 115 is moved from the second position to a third position. Since the tailgate 11 and the pivotal pushing arm 115 pivot about the same axis of rotation 112, the movement over substantially the same angle will have the result that the relative position between the tailgate-mounted guiding roller 113 and the first arm-mounted guiding roller 118 will remain the same. The pivotal pushing arm 115 remains in contact with the bale B. The bale B is still surrounded by the bale forming means 10.

FIG. 3 shows the bale forming apparatus 1 after the tailgate 11 has been pivoted from the bale receiving position to the bale supporting position, and simultaneous rotation of the pivotal pushing arm 115 from the second position to the third position around the common pivoting axis 112. It can be seen that the relative position between the tailgate-mounted guiding roller 113 and the first arm-mounted guiding roller 118 is the same in FIGS. 2 and 3. Further, it can be seen that the bale B is mainly supported by the tailgate 11, although some support is given by the pivotal pushing arm 115. The pivotal pushing arm 115 inhibits the bale B from rolling back towards the outlet 7.

In the first bale position next to the outlet 7 of the intake device 5, space is now available for the formation of a new bale, and formation of a new bale B' has already started. The part of the endless belt(s) 10 between the fixed guiding roller 114 and the second arm-mounted guiding roller 119 can be used to form a bale forming chamber for the new bale B'.

It is remarked that there is a space 121 between the second arm-mounted guiding roller 119 and the support roller 8.2. To prevent that crop material falls out of the bale forming chamber through this space 121, a gap closing roller 122 is arranged in this space. This gap closing roller 122 is movable through a longitudinal slot 123 between the active position wherein it fills the space 121 (shown in FIG. 3), and an inactive position wherein it does not interfere with the movements of the tailgate 11 and the pivotal pushing arm 115. This inactive position of the gap closing roller 122 is for example shown in FIG. 2.

A wrapping device 20 with a reel 88 for wrapping material (net or foil or yarn, e.g.) is provided on the tailgate 11 to arrange a wrap around the bale B during transfer of the bale B towards and/or when the bale B is arranged on the tailgate 11 in the second bale position. The winding of the wrap around the bale B may already be started in the first bale position, as long as there is no wrap between the outlet 7 of the intake device 5 and the bale B being formed.

Preferably, a wrap is already provided around a substantial part of the circumference when the bale B is in the first bale position, whereby there is no wrapping material between the outlet 7 of the intake device 5 and the bale B being formed. The wrapping material will not hamper the entrance of crop material in the bale forming chamber and thus the formation of a bale in the bale forming chamber. As soon as the bale has the desired size, the wrapping device 20 may release further wrapping material to provide a wrap around the complete circumference of the bale. In this way the wrap is provided relatively quickly about the complete circumference of the bale B. This reduces the risk that the crop material of the bale B will loosen or even fall apart during transfer of the bale B from the first bale position to the second bale position.

When the bale B is wrapped and thereby ready to be ejected and thereby released from the baling device 1, the tailgate 11 is moved from the bale supporting position to the bale ejecting position. This bale ejecting position may correspond to the fully open position of the tailgate 11 of the bale forming apparatus 1, wherein a bale is released from the baling device 1. In one embodiment the tailgate 11 is pivoted around more than 90 degrees when being pivoted into the bale ejecting position.

Figure 4:
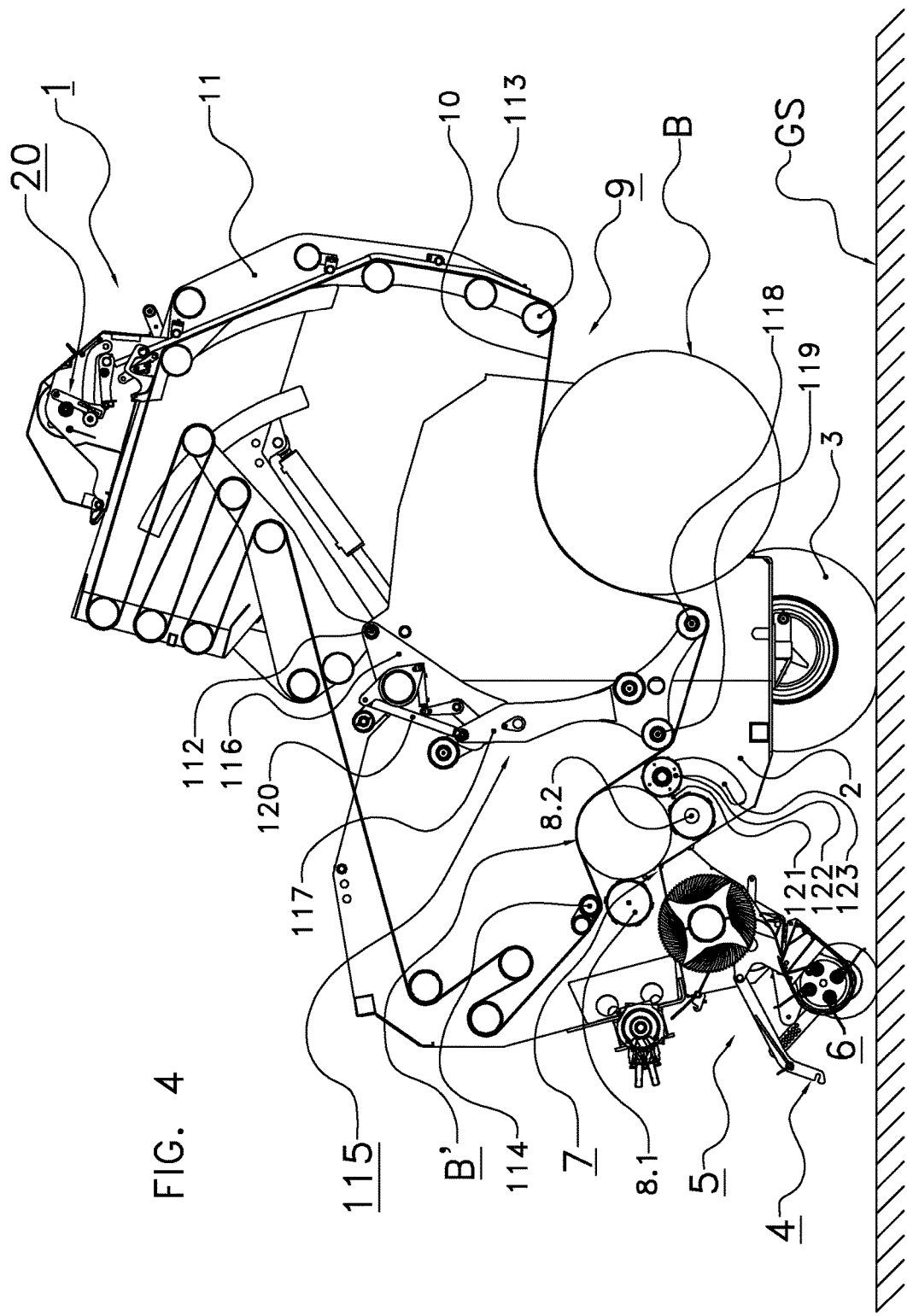
FIG. 4 shows the bale forming apparatus of FIG. 3 with the bale supporting construction pivoted into the bale ejecting position and the bale pushing device still in the pushing end position.

FIG. 4 shows the tailgate 11 in the bale ejecting position. In this bale ejecting position the bale B is ejected from the bale forming apparatus 1. The tensioned belt(s) 10 help to shift the bale B away from the bale forming apparatus 1. The new bale B' in the first bale position continues to grow. The pivotal pushing arm 115 substantially remains in the third position (pushing and position) such that the guiding rollers 118, 119 together with the fixed guiding roller 114 guide a segment of the belt (s) 10 which segment forms a bale forming chamber there between at least until the bale B is released from the bale forming apparatus 1 and the tailgate 11 is returned in a position in or near the bale receiving position, wherein the tailgate-mounted guiding roller 113 of the tailgate 11 can take over the function of the second arm-mounted guiding roller 119 to form a bale forming chamber together with the fixed guiding roller 114.

Figure 5:
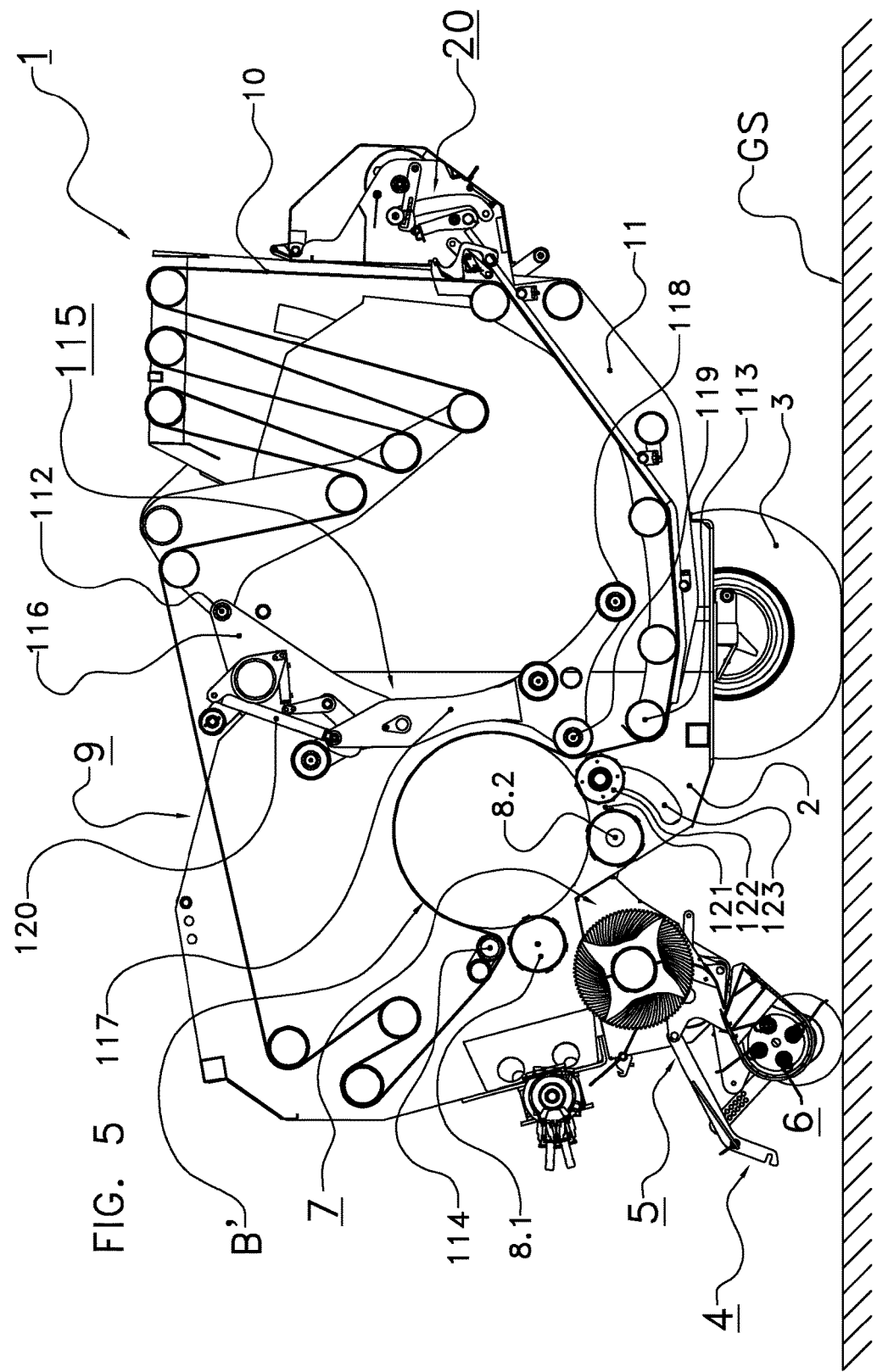
FIG. 5 shows the bale forming apparatus with the bale supporting construction while being pivoted back into the bale receiving position, the bale pushing device still in the pushing end position and the new bale increasing in the bale forming chamber.

FIG. 5 shows a situation wherein the tailgate 11 is almost returned to the bale receiving position after release of the bale B and wherein the pivotal pushing arm 115 is still in the third position. The gap closing roller 122 is also still in the active position.

Before the tailgate 11 can be completely pivoted back to the bale receiving position, the gap closing roller 122 has to be moved along the slot 123 to the inactive position. Further, when the function of the second arm-mounted guiding roller 119 to form a bale forming chamber together with the fixed guiding roller 114 can be taken over by the tailgate-mounted guiding roller 113, the pivotal pushing arm 115 can be moved back to the first position (pushing start position) for pushing the new bale B' from the first bale position to the second bale position.

In the embodiment shown in the Figures, the pivotal pushing arm 115 is a swing arm which is moved backwards and forwards over a limited range and therefore performs an oscillating movement. To make the movement of the pivotal pushing arm 115 over the bale B' in the first bale position possible the locking device 120 is deactivated so that the outer arm element 117 can freely rotate with respect to the inner arm element 116.

When carrying out a forward movement of the pivotal pushing arm 115 towards the first position, the outer arm element 117 will be pushed against the bale B'. The outer arm element 117 will either be pushed directly against the bale B' and/or against the endless belt(s) 10 forming the bale forming chamber for the bale B'. Since the outer arm element 117 can freely rotate with respect to the inner arm element 116, the outer arm element 117 will rotate with respect to the inner arm element 116. As result, the outer arm element 117 will be moved towards the retracted position until the radial extent of the pivotal pushing arm 115 is small enough to pass the pivotal pushing arm 115 over the bale B' without touching the bale B'.

Figure 6:
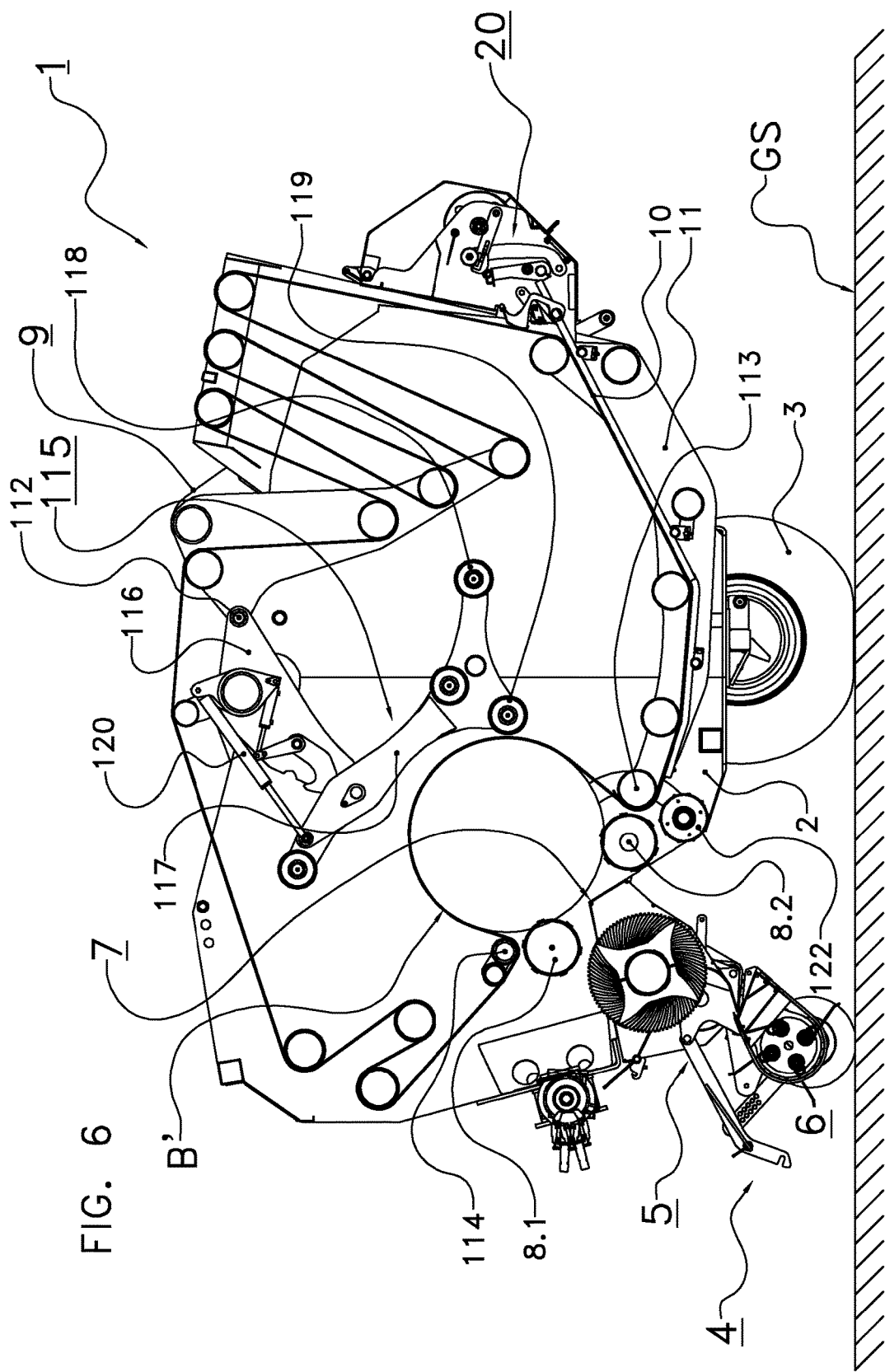
FIG. 6 shows the bale forming apparatus of FIG. 5 with the bale supporting construction being nearly completely pivoted back into the bale receiving position and the bale pushing device being pivoted around the bale towards a parking position above the new bale.

FIG. 6 shows the tailgate moved completely to the bale receiving position, and the gap closing roller 122 moved back to the inactive position. The pivotal pushing arm 115 is depicted during the forward movement with respect to the frame to bring the pivotal pushing arm 115 back to the first position, wherein the outer arm element 117 is pushed against the bale B' and, as a result, the outer arm element 117 has been rotated with respect to the inner arm element 116 from the extended position towards the retracted position.

Figure 7:
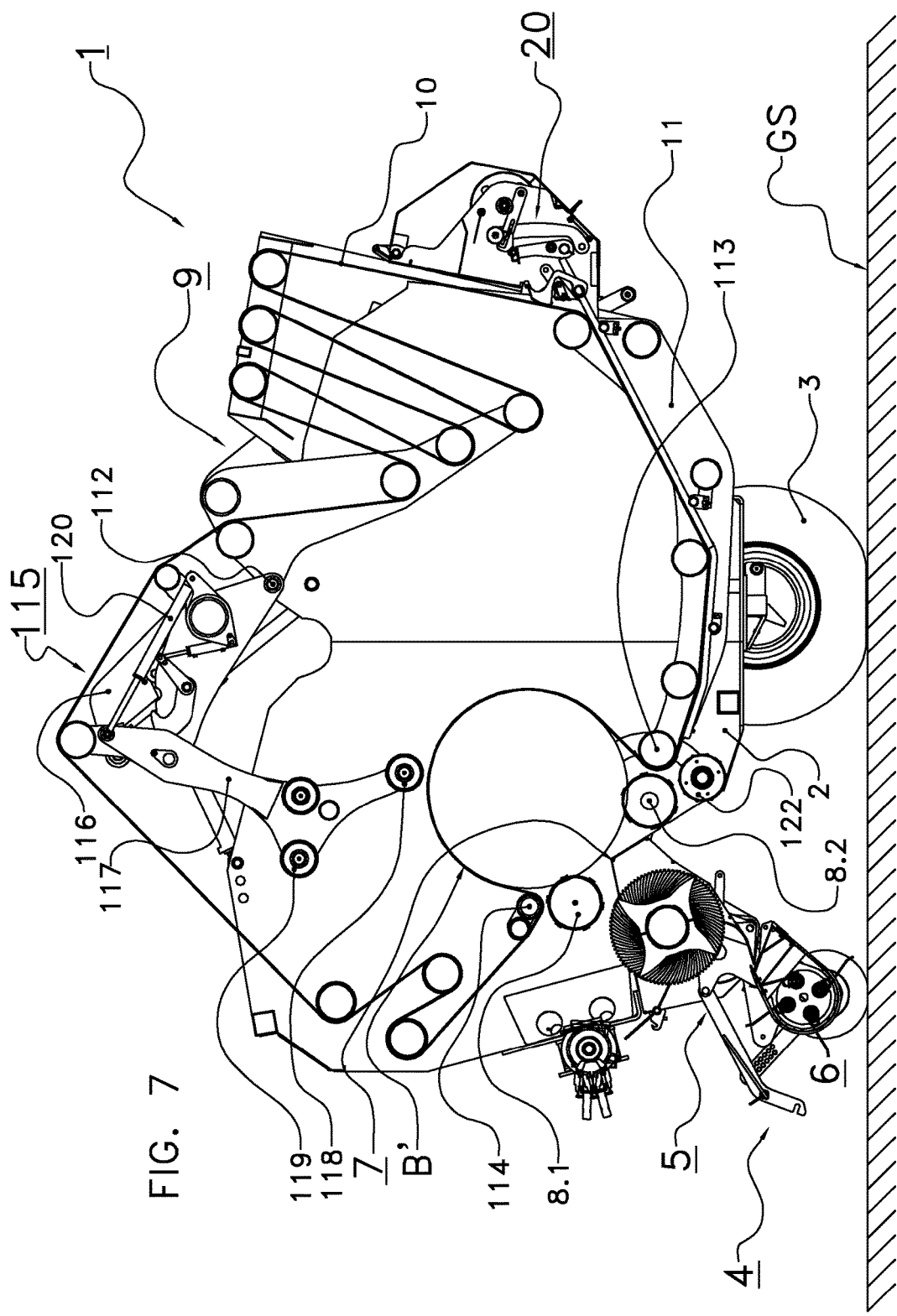
FIG. 7 shows the bale forming apparatus of FIG. 6 with the bale supporting construction in the bale receiving position and the bale pushing device further moved towards the parking position.

FIG. 7 shows the pivotal pushing arm 115 after further movement towards the first position. The pivotal pushing arm 115 has passed the bale B'. The outer arm element 117 can be moved back to the extended position.

Figure 8:
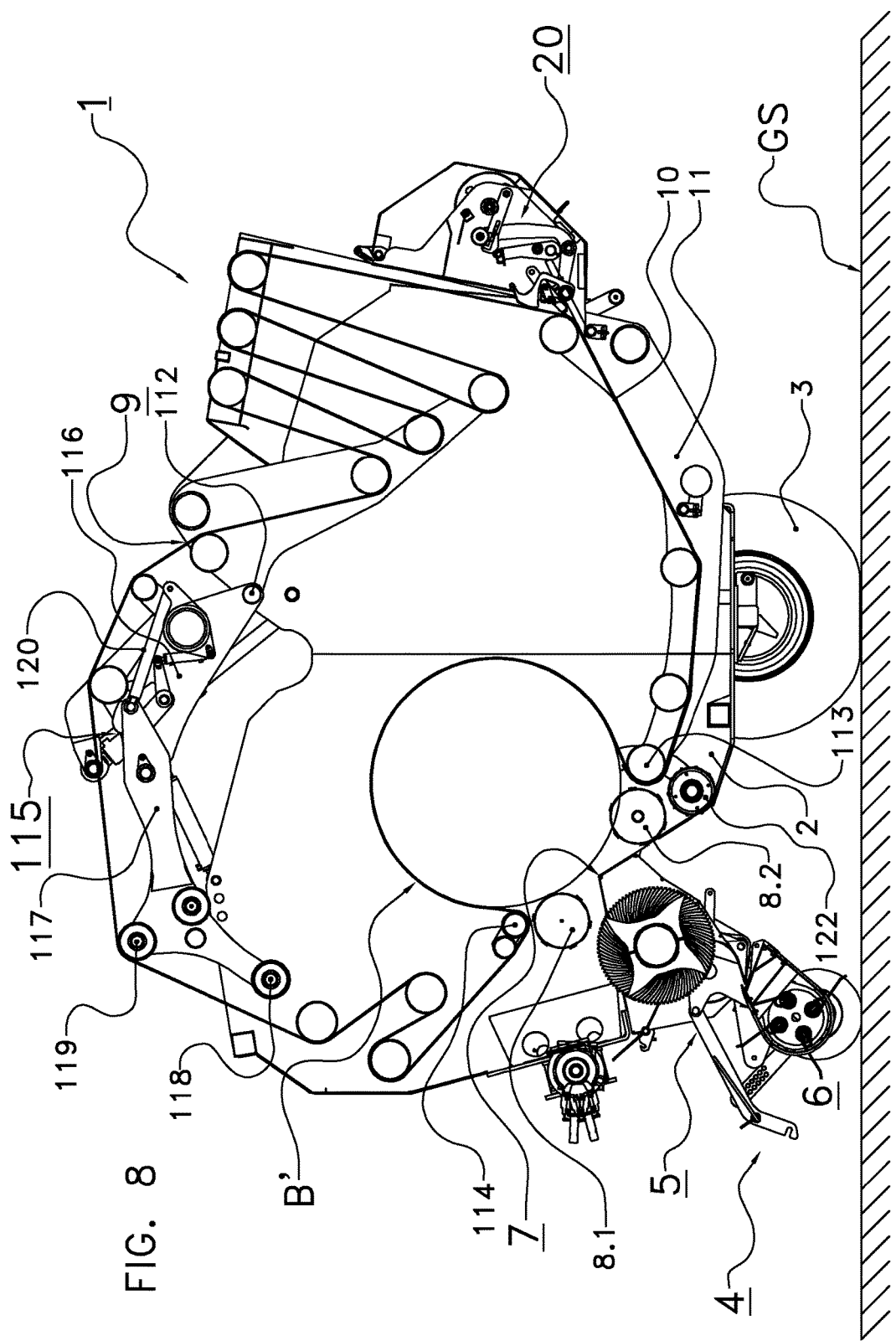
FIG. 8 shows the bale forming apparatus of FIG. 7 with the bale pushing device in the parking position and a new bale still increasing.

FIG. 8 shows the pivotal pushing arm 115 in the extended position. In this extended position, the locking device 120 may again lock the outer arm element 117 in this extended position. The pivotal pushing arm 115 is in a parking position above the bale B. From the comparison of FIG. 1 with FIG. 8 it can be seen that the pivotal pushing arm 115 is arranged in an angular position further forward with respect to the frame 2 than the angular position of the first position as shown in FIG. 1. Once the outer arm element 117 of the pivotal pushing arm 115 is in the extended position or during movement of the outer arm element 117 towards the extended position, the pivotal pushing arm 115 can be moved to the first position as shown in FIG. 1.

In the meantime the introduction of crop material in the bale forming apparatus is continued and the bale B' was growing. When the pivotal pushing arm 115 is positioned in the first position, the bale forming apparatus 1 is in the same state as shown in FIG. 1, and, when the bale B' fulfills the selected parameter or parameters, the transfer of bale B' from the first bale position to the second bale position may be performed, similar to the transfer of bale B described above, and a new bale may be formed in the first bale position.

The movements of the tailgate 11 and the pivotal pushing arm 115 may be configured such that continuous taking in of crop material into the bale forming apparatus 1, even at a high rate, and thus continuous driving of the bale forming apparatus 1 over the ground surface, is possible.

The only moment that feeding of crop material into the baling chamber may not be possible or is only limited possible is when the pivotal pushing arm 115 passes the outlet 7 of the intake device 5.

In one embodiment the intake device 5 comprises a feeding channel with a bottom. This bottom is arranged below the feeding rotor and is movable in a substantially vertical direction between a normal position and a dropped position. With the channel bottom in the dropped position an interior volume of the intake device is increased in comparison with an interior volume of the intake device 5 in the normal position of the movable channel bottom. The bale forming apparatus 1 is configured to move the movable bottom from the normal position to the dropped position just before the pivotal pushing arm 115 passes before the outlet 7 of the intake device 5, and to move the bottom back from the dropped position to the normal position after the pivotal pushing arm 115 has passed the outlet 7. In this way the interior of the intake device 5 is temporarily increased to store extra crop material when the pivotal pushing arm 115 passes before the outlet 7. The channel bottom is moved downwards against the force of a resilient means. The feeding channel serves as a buffer means for crop material.

Hereinabove, a pivotal pushing arm 115 has been described that is used as a swing arm movable over a limited angle. In an alternative, embodiment, the pivotal pushing arm 115 may be moved in a single rotation direction over 360 degrees about the axis of rotation for each cycle. Such rotating movement over 360 degrees can be carried out by an integral pivotal pushing arm which does not comprise two arm elements pivotal with respect to each other. However, this may result in a relative large height of the bale forming apparatus 1 when the arm rotates over the upper part of the cycle. To decrease the maximum height, the arm may be made up of two arm elements being movable between an extended and a retracted position. During the upper part of the cycle, the arm can be arranged in a retracted position which results in less height during this movement.

In other embodiments, also any other device capable of pushing the bale from the first bale position into the second bale position onto the movable support construction can be used.

It is remarked that hereinabove only the guiding rollers 113, 114, 118, 119 which guide the belt(s) 10 around the bale forming chamber have been denoted. The bale forming device 9 will have multiple further guiding rollers at fixed and movable location to guide the endless belt(s) 10. These guiding rollers may also include tensioning guiding rollers to tension the endless belt 10 and driving rollers to drive the endless belt 10. These guiding rollers are shown in FIGS. 1 to 8, but not denoted by reference numerals.

The pivotal movements of the movable support construction, for example the tailgate 11, and of the guiding element support, for example the pivotal pushing arm 115, may be performed by any suitable devices. In an embodiment, these movements are caused by hydraulic devices, such as hydraulic cylinders. The movements can also be implemented by electrical motors or pneumatic cylinders, e.g.

In the embodiment shown in FIGS. 1 to 8, the tailgate 11 and the pivotal pushing arm 115 are advantageously connected to each other by a single hydraulic cylinder. This provides for a simple and efficient movement of these parts. By fixing the length of the hydraulic cylinder, the relative position of the tailgate-mounted guiding roller 113 and the arm-mounted guiding rollers 118, 119 can be maintained. Movement of the pivotal bale supporting construction 11 carrying the tailgate-mounted guiding roller 113 can then be performed by another actuator. By locking the tailgate 11 with a locking device with respect to the frame 2, movements of the guiding element support with respect to the frame 2 can be performed by actuation of the hydraulic cylinder. By locking the tailgate-mounted guiding roller 113 with a locking device with respect to the frame 2, movements of the bale supporting construction 11 with respect to the frame can also be performed by actuation of the hydraulic cylinder.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

REFERENCE SIGNS

| | |
|---|---|
| B | first bale |
| B' | second bale |
| GS | ground surface |
| TD | travelling direction of the bale forming apparatus 1 |
| 1 | bale forming apparatus |
| 2 | frame of the bale forming apparatus 1 |
| 3 | wheels |
| 4 | front end with towing unit |
| 5 | intake device, comprises inlet 6 and outlet 7 |
| 6 | inlet of intake device 5 |
| 7 | outlet of intake device 5 |
| 8.1, 8.2 | Stationary supporting rollers |
| 9 | bale forming device, comprises endless belt(s) 10 |
| 10 | endless belt(s), belong to the bale forming means |
| 11 | pivotal tailgate, can be pivoted around the axis 112 |
| 20 | wrapping device with a reel 88 for wrapping material |
| 88 | reel for wrapping material |
| 112 | coinciding rotating axis of the tailgate 11 and of the pivotal pushing arm 115 |
| 113 | tailgate-mounted guiding roller, limits the bale forming chamber, mounted at the tailgate 11 |
| 114 | fixed guiding roller, limits the bale forming chamber |
| 115 | pivotal pushing arm, belongs to the bale pushing device |
| 116 | inner arm element of the pivotal pushing arm 115 |
| 117 | outer arm element of the pivotal pushing arm 115 |
| 118 | first arm-mounted guiding roller, mounted on the outer arm element 117 |
| 119 | second arm-mounted guiding roller, contributes to form a bale forming chamber while the bale B is on the tailgate 11, mounted on the outer arm element 117, serves as the pivotal guiding member |
| 120 | locking device, locks the outer arm element 117 in the extended position with the inner arm element 116 |
| 121 | space between the second arm-mounted guiding roller 119 and the support roller 8.2 |
| 122 | gap closing roller, closes the space 121 |
| 123 | longitudinal slot, guides the gap closing roller 122 |

The invention claimed is:

1. A bale forming apparatus for forming cylindrical bales of material, the bale forming apparatus comprising:
an intake device with an outlet;
a bale forming device;
a bale supporting construction;
a bale pushing device;
a pivotal guiding member; and
several further guiding members,
wherein the bale forming device comprises a bale forming mechanism adapted for surrounding a bale forming chamber adjacent to the outlet,
wherein the guiding members are adapted for guiding the bale forming mechanism,
wherein the intake device is adapted for conveying material through the outlet into the bale forming chamber,
wherein the bale forming device is adapted for forming a bale from material conveyed in the bale forming chamber by means of the bale forming mechanism,
wherein the bale supporting construction is adapted for carrying a bale which has been formed in the bale forming chamber,
wherein the bale pushing device is pivotally mounted such that the bale pushing device can be pivoted around a pivoting axis into a pushing start position and from the pushing start position in a pushing direction into a pushing end position and back from the pushing end position into the pushing start position and performs a reciprocating movement when being pivoted from the pushing start position via the pushing end position back into the pushing start position,
wherein the bale pushing device is arranged such that pivoting the bale pushing device from the pushing start position in the pushing direction pushes a bale formed in the bale forming chamber away from the outlet and onto the bale supporting construction,
wherein the pivotal guiding member is pivotally mounted and can be pivoted into a guiding position,
wherein the bale forming apparatus is adapted such that pivoting the bale pushing device into the pushing end position causes the pivotal guiding member to be pivoted into the guiding position and pivoting the bale pushing device back from the pushing end position into the pushing start position moves the bale pushing device towards the outlet, and
wherein the pivotal guiding member in the guiding position contributes to guiding the bale forming mechanism such that a bale forming chamber surrounded by the bale forming mechanism and adapted for forming a further bale is also provided when the bale support construction carries a bale.

2. The bale forming apparatus according to claim 1, wherein the bale forming apparatus is arranged such that the bale pushing device is situated between the pivoting axis of the bale pushing device and the outlet of the intake device during the entire reciprocating movement of the bale pushing device.

3. The bale forming apparatus according to claim 1, wherein the bale pushing device comprises a pushing arm with an inner arm element and an outer arm element, the inner arm element is pivotally connected with the pivoting axis of the bale pushing device, the outer arm element is hingedly connected with the inner arm element and is adapted for pushing a bale in the pushing direction.

4. The bale forming apparatus according to claim 3, wherein the outer arm element has a free end opposite to the hinged connection with the inner arm element, the pushing arm can be transferred into an extracted state and into a retracted state, the distance between the free end and the pivoting axis is in the expanded state larger than in the retracted state, the bale pushing device is adapted for pushing a bale with the pushing arm being in the expanded state, the bale pushing device is further adapted for being transferred into the retracted state while the bale pushing device is moved from the pushing end position into the pushing start position.

5. The bale forming apparatus according to claim 3, wherein the bale pushing device further comprises a locking device, the locking device is adapted for releasably locking the outer arm element with the inner arm element such that the pushing arm remains in the expanded state until the locking device is released.

6. The bale forming apparatus according to claim 1, wherein the bale pushing device is arranged for being moved around an area of the bale forming means mechanism surrounding a bale in the bale forming chamber when being pivoted from the pushing end position into the pushing start position.

7. The bale forming apparatus according to claim 1, wherein the guiding element is mechanically connected with the bale pushing device.

8. The bale forming apparatus according to claim 1, wherein the guiding element (119) being in the guiding position is arranged between the outlet and a bale being on the bale supporting construction such that a bale forming chamber adjacent to the outlet is provided.

9. The bale forming apparatus according to claim 1, wherein the pivotal guiding member is mounted such that it can be pivoted into a parking position, and the distance between the outlet and the pivotal guiding member being in the parking position is greater than to the pivotal guiding member being in the guiding position.

10. The bale forming apparatus according to claim 1, wherein the bale pushing device in the pushing end position is arranged between the outlet of the intake device and a bale on the bale supporting structure.

11. The bale forming apparatus according to claim 1, wherein the bale pushing device can be pivoted from the pushing end position into a parking position and from the parking position into the pushing start position, and the bale forming chamber is arranged between the bale pushing device in the parking position and the outlet.

12. The bale forming apparatus according to claim 1, wherein:
the bale supporting construction is pivotally mounted such that the bale supporting construction can be pivoted into a bale receiving position and into at least one further position,
the bale forming apparatus is adapted for pushing a bale onto the bale supporting construction being in the bale receiving position by pivoting the bale pushing device into the pushing end position,
the bale forming apparatus is further adapted for pivoting the bale supporting construction carrying a bale from the bale receiving position into the further position, thereby increasing the distance between the bale on the bale support construction and the outlet of the intake device.

13. The bale forming apparatus according to claim 12, wherein at least one guiding member, which guides the bale forming mechanism, is mechanically connected with the bale supporting construction such that pivoting the bale supporting construction from the bale receiving position into the further position pivots the connected guiding member.

14. The bale forming apparatus according to claim 13, wherein:
the bale forming apparatus is arranged such that pivoting the connected guiding member by pivoting the bale supporting construction into the further position forms a space between the bale supporting construction and a bale on the bale supporting construction, and
the bale forming apparatus is further arranged to pivot the bale pushing device into this space, thereby limiting a movement of a bale in a direction anti parallel to the pushing direction while the bale is on the bale supporting construction being in the further position.

15. The bale forming apparatus according to claim 12, wherein:
the bale supporting construction is pivotally mounted such that the bale supporting construction can be pivoted from the bale receiving position into a bale supporting position as a first further position and from the bale supporting position into a bale ejecting position,
the bale forming apparatus is adapted such that the bale pushing device limits a movement of a bale on the bale supporting construction being in the bale supporting position, and
the bale forming apparatus is further adapted for ejecting a bale If the bale supporting construction is in the bale ejecting position.

16. A method for forming cylindrical bales of material, the method comprising the steps of:
conveying material with an intake device through an outlet into a bale forming chamber adjacent to the outlet of the intake device;
forming a cylindrical bale with a bale forming device in the bale forming chamber by means of a bale forming mechanism surrounding the bale forming chamber;
forming the bale from material, which is conveyed into the bale forming chamber;
guiding the bale forming mechanism by several guiding members;
pivoting a bale pushing device (115) is pivoted around a pivoting axis from a pushing start position in a pushing direction into a pushing end position and back from the pushing end position into the pushing start position such that the bale pushing device performs a reciprocating movement when being pivoted from the pushing start position into the pushing end position and back into the pushing start position, wherein pivoting the bale pushing device in the pushing direction pushes the bale formed in the bale forming chamber away from the outlet and onto a bale supporting construction, pivoting the bale pushing device back from the pushing end position into the pushing start position moves the bale pushing device towards the outlet, pivoting the bale pushing device into the pushing end position further causes a pivotal guiding member to be pivoted into a guiding position, and the guiding element in the guiding position contributes to guiding the bale forming mechanism such that a bale forming chamber surrounded by the bale forming mechanism is also provided while the bale supporting construction carries the bale having been pushed by the bale pushing unit; and
starting the forming of a further bale in the provided bale forming chamber.

17. The bale forming method according to claim 16, wherein the method comprises the additional step of pivoting the bale pushing device from the pushing end position into a parking position and from the parking position into the pushing start position, where the bale forming chamber is arranged between the bale pushing device being in the parking position and the outlet.

18. The bale forming method according to claim 16, wherein the bale supporting construction carrying the bale is pivoted from a bale receiving position into at least one further position, pivoting the bale supporting construction into the further position increases the distance between the bale on the bale supporting construction and the outlet, and wherein the bale supporting construction in the further position still carries the bale.

19. The bale forming method according to claim 16, wherein the bale pushing device is pivoted from the pushing end position into a bale supporting position, pivoting the bale pushing device into the supporting position prevents the cylindrical bale from rolling towards the outlet while the bale supporting construction is pivoted from the bale receiving position into the bale supporting position.

20. The bale forming method according to claim 16, wherein the step of pivoting the bale pushing device from the pushing start position into the pushing end position and back from the pushing end position into the pushing start position further comprises the steps of:
transferring a pushing arm belonging to the bale pushing device and comprising an inner arm element and an outer arm element into an expanded state by pivoting the outer arm element away from the inner arm element;
pivoting the pushing arm in the expanded state in a pushing direction to push the bale away from the outlet, outlet;

pivoting the pushing arm into a retracted state by pivoting the outer arm element towards the inner arm element; and pivoting the pushing arm in the retracted state is in a direction opposite to the pushing direction.

* * * * *